(12) United States Patent
Kim et al.

(10) Patent No.: US 12,466,171 B2
(45) Date of Patent: Nov. 11, 2025

(54) METHOD AND APPARATUS FOR MANUFACTURING DISPLAY DEVICE

(71) Applicant: SAMSUNG DISPLAY CO., LTD., Yongin-si (KR)

(72) Inventors: Minki Kim, Yongin-si (KR); Yongkyu Kang, Yongin-si (KR); Jihyun Ko, Yongin-si (KR); Jinsu Nam, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 184 days.

(21) Appl. No.: 18/357,070

(22) Filed: Jul. 21, 2023

(65) Prior Publication Data

US 2024/0034041 A1 Feb. 1, 2024

(30) Foreign Application Priority Data

Jul. 27, 2022 (KR) .................. 10-2022-0093452

(51) Int. Cl.
| | | |
|---|---|---|
| *B32B 37/00* | (2006.01) | |
| *B32B 7/12* | (2006.01) | |
| *B32B 37/12* | (2006.01) | |
| *B32B 41/00* | (2006.01) | |

(52) U.S. Cl.
CPC ............ *B32B 37/0046* (2013.01); *B32B 7/12* (2013.01); *B32B 37/12* (2013.01); *B32B 41/00* (2013.01); *B32B 2307/546* (2013.01); *B32B 2457/20* (2013.01)

(58) Field of Classification Search
CPC .......... B32B 2457/20; B32B 2307/546; B32B 41/00; B32B 37/12; B32B 7/12; B32B 37/0046; B29C 65/82; B29C 66/874; B29C 66/90
See application file for complete search history.

(56) References Cited

U.S. PATENT DOCUMENTS

| | | | |
|---|---|---|---|
| 7,966,861 B2 | 6/2011 | Yee et al. | |
| 2004/0203446 A1* | 10/2004 | Seung | G01N 3/40 |
| | | | 455/67.11 |
| 2021/0036259 A1* | 2/2021 | Song | H10K 59/8793 |

FOREIGN PATENT DOCUMENTS

| | | |
|---|---|---|
| KR | 10-0480053 | 3/2005 |
| KR | 10-0908725 | 7/2009 |
| KR | 10-0913184 | 8/2009 |
| KR | 10-1767531 | 8/2017 |
| KR | 10-1866633 | 7/2018 |

OTHER PUBLICATIONS

Machine translation of KR20170125240A. (Year: 2017).*
GizmoSlip, "iPhone 11 Drop Test! The Most Durable iPhone Ever!", published on Sep. 21, 2019, retrieved on Oct. 5, 2021 <URL:https://youtu.be/sJhmjQx7ZwU?t=372>.

* cited by examiner

*Primary Examiner* — Vishal I Patel
(74) *Attorney, Agent, or Firm* — F. CHAU & ASSOCIATES, LLC

(57) ABSTRACT

An apparatus for manufacturing a display device includes a stage, a surface member disposed on the stage, a linear motion portion that is spaced apart from the stage and that linearly moves, a mock-up portion disposed on the linear motion portion and that falls to the surface member, and a cover window coupled to the mock-up portion and that includes one surface exposed outside the mock-up portion.

11 Claims, 12 Drawing Sheets

METHOD AND APPARATUS FOR MANUFACTURING DISPLAY DEVICE

CROSS-REFERENCE TO RELATED APPLICATION

This application claims priority under 35 U.S.C. § 119 from Korean Patent Application No. 10-2022-0093452, filed on Jul. 27, 2022 in the Korean Intellectual Property Office, the contents of which are herein incorporated by reference in their entirety.

TECHNICAL FIELD

One or more embodiments are directed to a method and apparatus, and more particularly, to a method and apparatus for manufacturing a display device.

DISCUSSION OF THE RELATED ART

Mobile electronic devices have become widely used. In addition to small electronic devices, such as mobile phones, tablet personal computers ("PCs") have recently become widely used as mobile electronic devices.

To support various functions, a mobile electronic device includes a display device that provides a user with visual information, such as images or video. Recently, as other parts that drives the display device have been reduced in size, a proportion occupied by display devices in electronic devices has been gradually increasing, and a structure that can be bent to an angle from a flat state has also been developed.

A display device typically includes a cover window that protects an outer surface. In this regard, when the display device falls, the cover window may be broken. To check breakage of the cover window, an experiment has to be performed after a cover window is attached to an actual product, and accordingly, the actual product may be damaged or higher costs may be incurred.

SUMMARY

One or more embodiments include a method and apparatus for manufacturing a display device, in which, by fabricating a mock-up portion that simulates an actual product, a drop experiment is carried out in a state as similar as possible to that in which a cover window is attached to an actual product.

According to one or more embodiments, an apparatus for manufacturing a display device includes a stage, a surface member disposed on the stage, a linear motion portion that is spaced apart from the stage and that linearly moves, a mock-up portion disposed on the linear motion portion and that falls to the surface member, and a cover window coupled to the mock-up portion and that includes a portion that protrudes from an end of the mock-up portion and one surface exposed outside of the mock-up portion.

The mock-up portion may include a mock-up body portion that is selectively detachable from the linear motion portion, and an adhesive member disposed on the mock-up body portion and to which the cover window is attached.

The mock-up body portion may include a case, and a load portion disposed in the case.

The load portion may include a first load portion, and a second load portion that is spaced apart from the first load portion.

The mock-up portion may further include a protrusion that protrudes from the mock-up body portion, faces a side surface of the cover window, and surrounds a portion of the side surface.

A portion of the cover window may protrude from an end of the protrusion.

At least a portion of the cover window may be bent.

A stiffness of the mock-up portion calculated through a three-point bending test may be in a range from 130 N/mm to 350 N/mm.

A stiffness of the mock-up portion calculated through a three-point bending test at 30° may be in a range from 50 N/mm to 200 N/mm.

According to one or more embodiments, a method of manufacturing a display device includes performing a three-point bending test of an electronic device on which a cover window is attached, calculating a stiffness of the electronic device, fabricating a mock-up portion that has the stiffness of the electronic device, wherein the cover window is attached to the mock-up portion, and testing a breakage tendency of the cover window by dropping the cover window together with the mock-up portion.

The method may further include dropping the cover window to a surface member.

At least a portion of the cover window may be bent.

The method may further include attaching the cover window to an adhesive member of the mock-up portion.

One surface of the cover window may be exposed outside the mock-up portion.

The stiffness of the mock-up portion calculated through the three-point bending test may be in a range from 130 N/mm to 350 N/mm.

The stiffness of the mock-up portion calculated through a three-point bending test at 30° may be in a range from 50 N/mm to 200 N/mm.

The mock-up portion may include a mock-up body portion to which an adhesive member is attached.

The mock-up portion may further include a protrusion that protrudes from the mock-up body portion and surrounds a portion of a side surface of the cover window.

A portion of the cover window may protrude from an end of the protrusion.

The mock-up portion may further include a plurality of load portions disposed in the mock-up body portion and that are spaced apart from each other.

These general and specific embodiments can be implemented by using a system, a method, a computer program, or a combination thereof.

DETAILED DESCRIPTION

Figure 1:
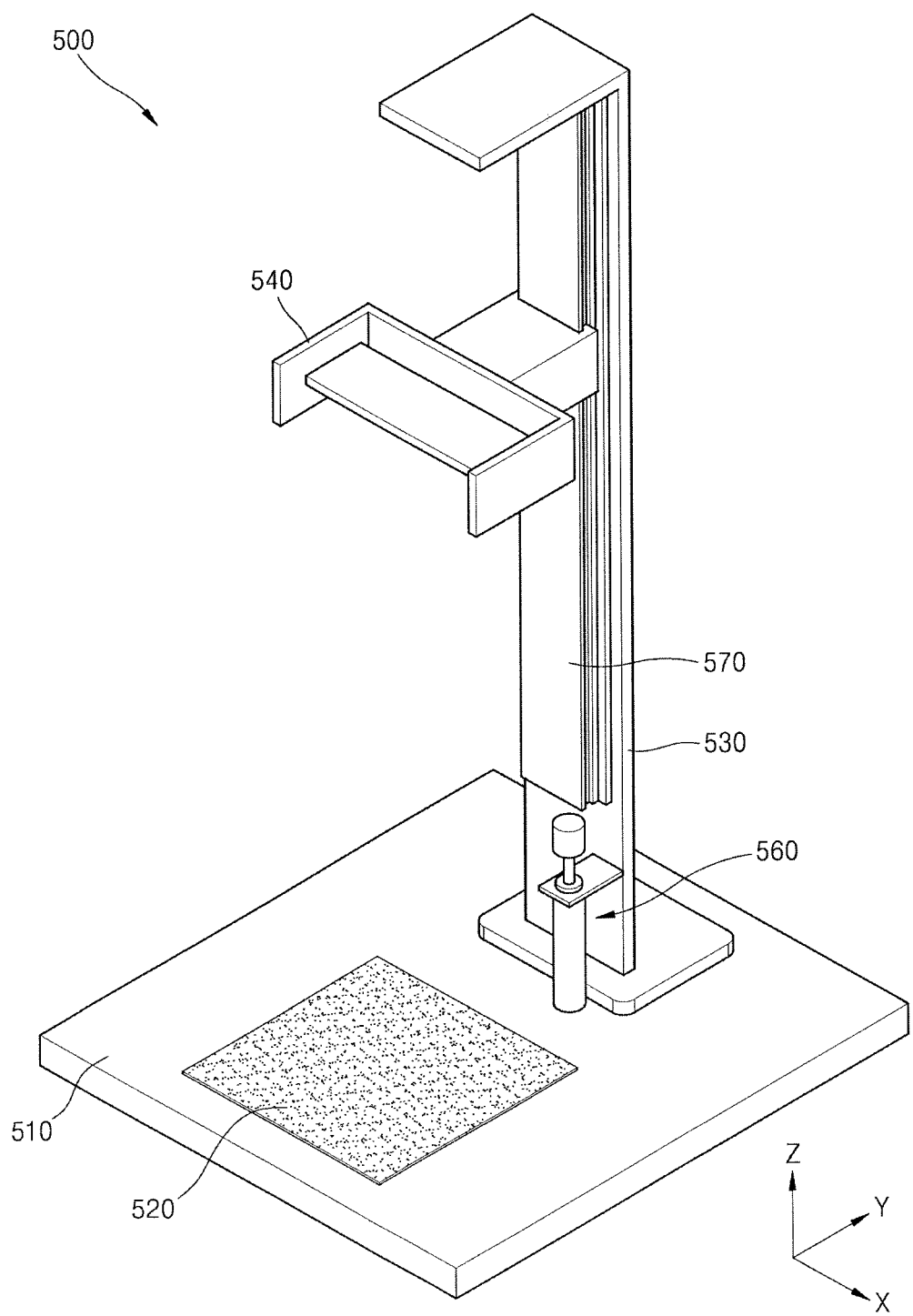
FIG. 1 is a perspective view of an apparatus for manufacturing a display device, according to an embodiment.

Reference will now be made in detail to embodiments, examples of which are illustrated in the accompanying drawings, wherein like reference numerals may refer to like elements throughout. In this regard, the present embodiments may have different forms and should not be construed as being limited to the descriptions set forth herein.

One or more embodiments will be described below in more detail with reference to the accompanying drawings. Those elements that are the same or are in correspondence with each other may have the same reference numeral regardless of the figure number, and redundant descriptions thereof may be omitted.

It will be further understood that, when a layer, region, or element is referred to as being on another layer, region, or element, it may be directly or indirectly on the other layer, region, or element.

The x-axis, the y-axis, and the z-axis are not limited to three axes of the rectangular coordinate system and may be interpreted in a broader sense. For example, the x-axis, the y-axis, and the z-axis may be perpendicular to one another or may represent different directions that are not perpendicular to one another.

Figure 2A:
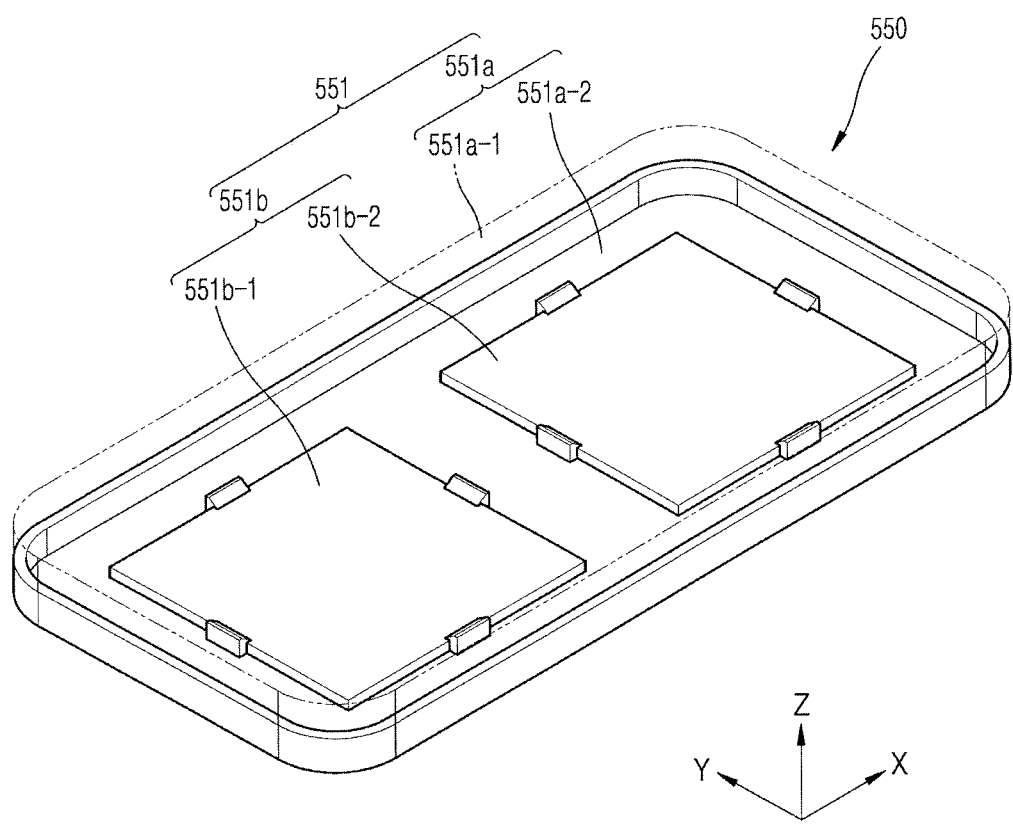
FIG. 2A is a perspective view of a mock-up portion shown in FIG. 1.
Figure 2B:
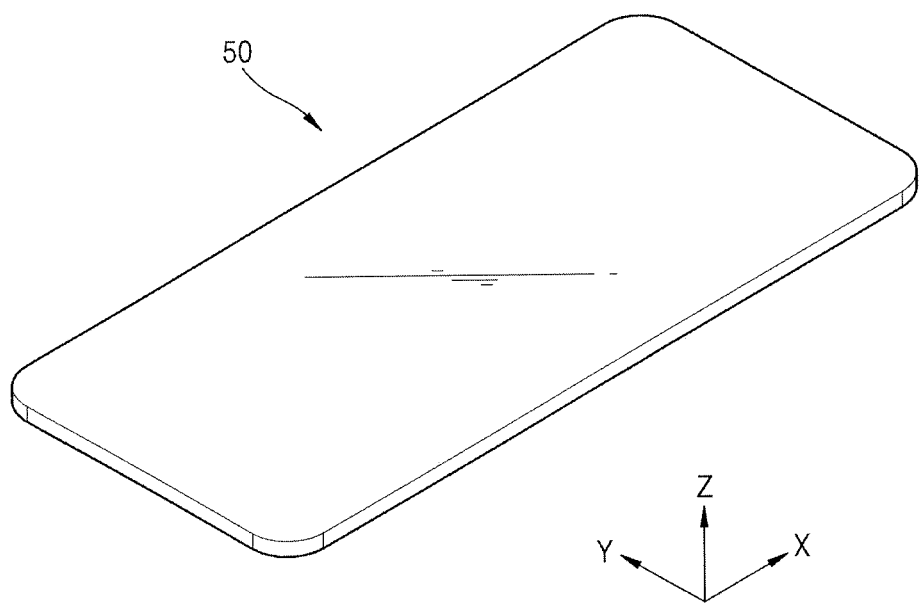
FIG. 2B is a perspective view of a cover window according to an embodiment.
Figure 2C:
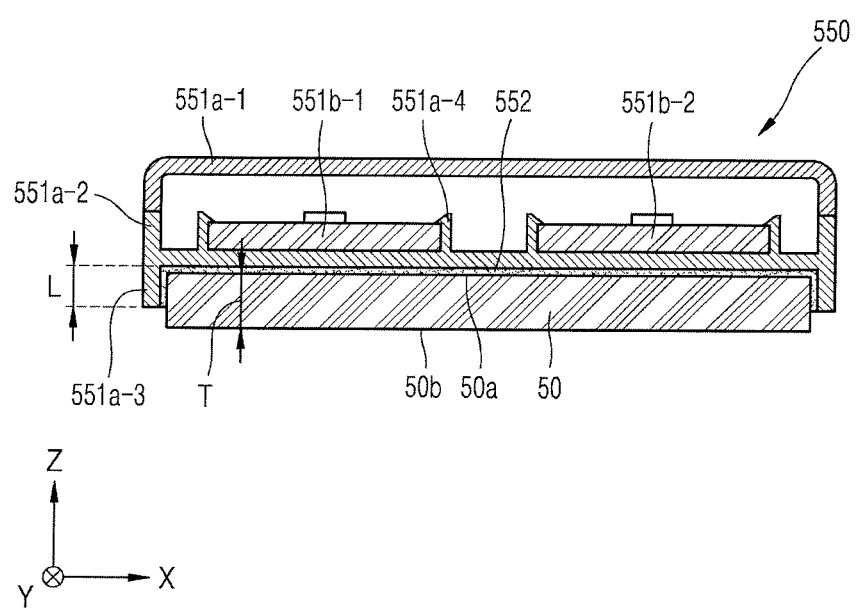
FIG. 2C is a cross-sectional view of a cover window of FIG. 2B attached to a mock-up portion of FIG. 2A.
Figure 3:
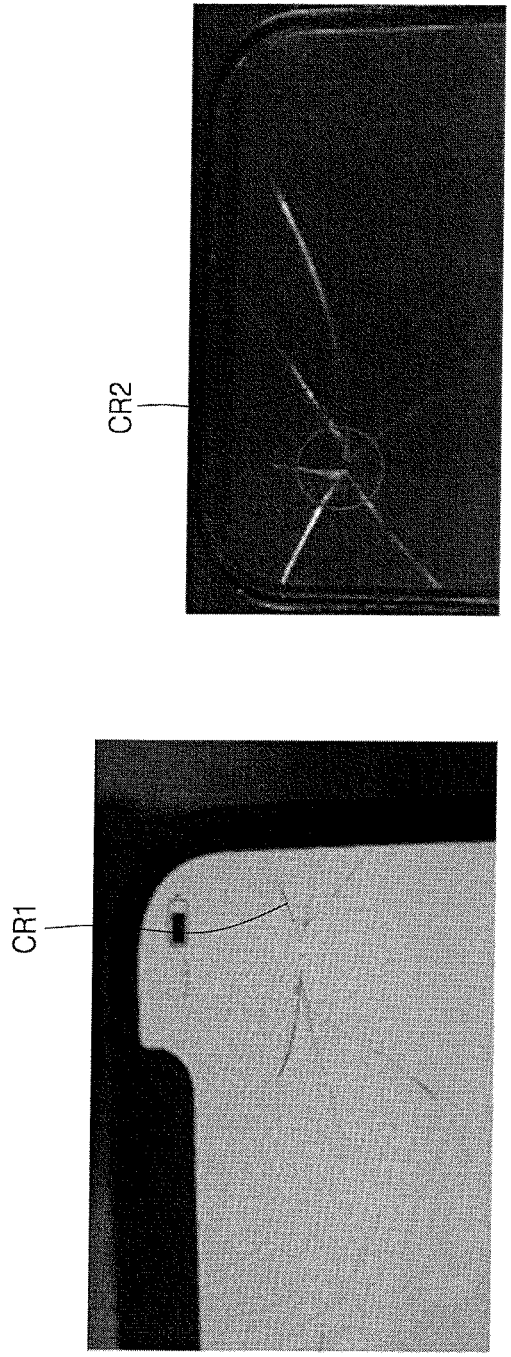
FIG. 3 illustrates a result of carrying out a collision experiment of a cover window using an apparatus for manufacturing a display device, shown in FIG. 1.

FIG. 1 is a perspective view of an apparatus 500 for manufacturing a display device, according to an embodiment. FIG. 2A is a perspective view of a mock-up portion 550 shown in FIG. 1. FIG. 2B is a perspective view of a cover window 50 according to an embodiment. FIG. 2C is a cross-sectional view of the cover window 50 of FIG. 2B attached to the mock-up portion 550 of FIG. 2A. FIG. 3 illustrates a result of carrying out a collision experiment of a cover window using the apparatus 500 for manufacturing a display device, shown in FIG. 1.

Referring to FIGS. 1 to 3, in an embodiment, the apparatus 500 for manufacturing a display device includes a stage 510, a surface member 520, a support 530, a linear motion portion 540, the mock-up portion 550, the cover window 50, a buffer portion 560 and a driver 570.

The stage 510 has a plate shape. The stage 510 is disposed on a flat surface. For example, the stage 510 may be disposed on the floor of a building, the ground, or a separate structure.

The surface member 520 is disposed on the stage 510. For example, the surface member 520 resembles a surface on which an electronic device falls. For example, a surface of the surface member 520 may include protrusions. In particular, the surface member 520 includes sandpaper. For example, surface roughness of the surface member 520 can vary according to the roughness of a surface on which an electronic device may fall.

The support 530 is connected to the stage 510. For example, the support 530 is aligned with the direction of gravity to facilitate the linear motion portion 540.

The linear motion portion 540 is connected to the support 530. For example, the linear motion portion 540 is fixed to the support 530 or may linearly move along a longitudinal direction of the support 530. For example, the linear motion portion 540 may free-fall or fall due to a constant force. Hereinafter, an embodiment in which the linear motion portion 540 falls due to a constant force will be described for convenience of explanation.

The driver 570 is positioned between the linear motion portion 540 and the support 530. For example, the driver 570 includes a linear motor. In another embodiment, the driver 570 is connected to the linear motion portion 540 and includes a cylinder fixed to the support 530. In some embodiments, the driver 570 includes a ball screw connected to the linear motion portion 540 and a motor connected to the ball screw and fixed to the support 530. However, the driver 570 is not necessarily limited thereto, and in other embodiment, includes any device and structure that connects the linear motion portion 540 and the support 530 to each other and allows the linear motion portion 540 to move up and down. For example, the driver 570 includes a guide that guides movement of the linear motion portion 540.

The linear motion portion 540 selectively constrains the mock-up portion 550. For example, the linear motion portion 540 includes an electrostatic chuck or a vacuum chuck. Hereinafter, an embodiment where the linear motion portion 540 includes a vacuum chuck will be mainly described for convenience of explanation.

The mock-up portion 550 corresponds to an actual electronic device. For example, the mock-up portion 550 corresponds to a slope of a change in an applied force according to a change in a deformation value, or a degree of change in force according to a degree of change in a deformation value, or a stiffness of the mock-up portion 550, obtained through a three-point bending test of an actual electronic device. For example, in a three-point bending test, after two first contact points are determined on a first surface of an actual electronic device, and one second contact point is determined on a second surface of the electronic device, force is applied at the two first contact points, or a force is applied at the one second contact point. For example, a deformation value at which a point of the electronic device is deformed is measured, and applied force is measured. More specifically, as described above, when a constant force is applied to the second surface of the electronic device, a deformation value of the electronic device is measured by measuring how much a portion of the second surface of the electronic device in contact with the one second contact point has moved relative to an initial position. Alternatively, in an above embodiment, a deformation value of the electronic device is measured based on how much a portion of the first surface of the electronic device in contact with the two first contact points has moved relative to an initial position. In another embodiment, even when force is applied to the two first contact points of the first surface of the electronic device, similar to that described above, a deformation value of the electronic device is measured by measuring a degree of movement of the one second contact point relative to an initial position, or measuring a degree of movement of the two first contact points relative to an initial position. During the above operations, a deformation value is measured while varying the magnitude of force applied to the first or second surface of the electronic device, or the magnitude of the applied force is measured while varying a deformation value. The magnitude of the force that varies according to a deformation value has the form of a straight line or an almost straight line. Thus, stiffness of the electronic device can be calculated through an amount of change in force according to an amount of change in a deformation value.

An actual electronic device described above may be one of various devices. For example, the actual electronic device may be a mobile phone, a monitor, a television (TV), a personal digital assistant (PDA), or a tablet. However, the actual electronic device is not necessarily limited thereto, and may be any device that includes a display panel.

To precisely fabricate the mock-up portion 550 as described above, other methods are used in addition to the above method of a three-point bending test. For example, a three-point bending test can be performed when an electronic device is 30° rotated with respect to an arbitrary line segment that connects two second contact points. For example, when the electronic device has a rectangular shape, an angle between one side of the electronic device and an arbitrary line segment that connects two second contact points is about 30°. Through such a test, as described above, a relationship with an amount of change in force as a function of an amount of change in a deformation value can be confirmed. For example, as described above, the relationship of an amount of change in force as a function of an amount of change in a deformation value may be linear. For example, as described above, a deformation value of an electronic device may be a degree of position change of a portion of the electronic device disposed at a first contact point or a degree of position change of a portion of the electronic device disposed at the second contact points.

In an embodiment, a value obtained by dividing an amount of change of an applied force by an amount of change of a deformation value in a three-point bending test of the mock-up portion 550 ranges from 130 N/mm to 350 N/mm. For example, the mock-up portion 550 is the same as or similar to a relationship of force to a deformation value in a three-point bending test of an actual electronic device. For example, when the mock-up portion 550 has the cover window 50 fixed thereto and collides with an external object or an experimental subject, the same or similar behavior as when an electronic device that includes the cover window 50 collides with an external object or an experimental subject is exhibited. However, outside of the above range, the mock-up portion 550 may fail to simulate an actual electronic device.

In addition to an above embodiment, when a three-point bending test is performed when the mock-up portion 550 is 30° rotated with respect to an arbitrary line segment that connects two second contact points, a value obtained by dividing an amount of change in applied force by an amount of change in a deformation value in the three-point bending test of the mock-up portion 550 ranges from 50 N/mm to 200 N/mm.

The mock-up portion 550 includes a mock-up body portion 551 that is selectively detachable from the linear motion portion 540, and an adhesive member 552 disposed at the mock-up body portion 551.

The mock-up body portion 551 includes a case 551*a* and a load portion 551*b* disposed in the case 551*a*. The case 551*a* includes a first case 551*a*-1 and a second case 551*a*-2 that are coupled to each other. For example, the case 551*a* includes a protrusion 551*a*-3 that protects a side surface of the cover window 50. A length L of the protrusion 551*a*-3 is less than a thickness T of the cover window 50. Thus, the cover window 50 protrudes from an outer side of the protrusion 551*a*-3. The protrusion 551*a*-3 surrounds the edge of the cover window 50. For example, the protrusion 551*a*-3 has a closed-loop shape.

The load portion 551*b* is disposed in the case 551*a*, and is fixed by engaging an edge thereof with a coupling protrusion 551*a*-4 formed in the case 551*a*. The load portion 551*b* determines a stiffness, weight, etc., of the mock-up portion 550 that simulates an actual electronic device.

The load portion 551*b* may be disposed in various portions in the case 551*a*. In an embodiment, the load portion 551*b* is disposed in a center of the case 551*a*. In an embodiment, the load portion 551*b* is not disposed in a center of the case 551*a* but rather close to the edge of the case 551*a*.

The load portion 551*b* includes a plurality of load portions 551*b*. For example, the number of load portions 551*b* is two or more. Hereinafter, an embodiment in which the number of load portions 551*b* is two will be mainly described for convenience of explanation.

The load portion 551*b* includes a first load portion 551*b*-1 and a second load portion 551*b*-2 that are spaced apart from each other. The first load portion 551*b*-1 and the second load portion 551*b*-2 may be arranged at various positions. In an embodiment, the first load portion 551*b*-1 and the second load portion 551*b*-2 are symmetrically arranged with respect to a center of the case 551*a*. In an embodiment, the first load portion 551*b*-1 and the second load portion 551*b*-2 are arranged at different distances from a center of the case 551*a*. Hereinafter, an embodiment in which the first load portion 551*b*-1 and the second load portion 551*b*-2 are symmetrically arranged with respect to a center of the case 551*a* will be mainly described below for convenience of explanation.

The first load portion 551*b*-1 and the second load portion 551*b*-2 may have various shapes. In an embodiment, the first load portion 551*b*-1 and the second load portion 551*b*-2 have the same shape as each other. In an embodiment, the first load portion 551*b*-1 and the second load portion 551*b*-2 have different shapes from each other. For example, the first load portion 551*b*-1 and the second load portion 551*b*-2 have one of a polygonal shape, a circular shape, an oval shape, or an atypical shape. Hereinafter, an embodiment in which the first load portion 551*b*-1 and the second load portion 551*b*-2 have a square shape will be mainly described for convenience of explanation.

The first load portion 551*b*-1 and the second load portion 551*b*-2 may have the same weight or different weights from each other.

At least one of a position, a shape, or a weight of each of the first load portion 551*b*-1 and the second load portion 551*b*-2 is determined such that results of a three-point bending test of the mock-up portion 550 and a three-point bending test when 30° rotated with respect to an arbitrary line segment connecting two second contact points are the same as or almost similar to those of a three-point bending test of an actual electronic device and a three-point bending test when 30° rotated with respect to an arbitrary line segment connecting two second contact points.

The adhesive member 552 is disposed in the mock-up body portion 551 and fixes the cover window 50 to the body portion 551. The adhesive member 552 includes an adhesive material. The cover window 50 includes a same material and shape as a cover window used in an actual electronic device.

In an embodiment, the cover window 50 has a polygonal shape. In an embodiment, the cover window 50 has one of a circular shape, an oval shape, etc. In an embodiment, the cover window 50 has an atypical shape other than a circular shape, an oval shape, and a polygonal shape. Hereinafter, an embodiment in which the cover window 50 has a polygonal shape will be mainly described for convenience of explanation.

A planar shape of the cover window 50 may be rectangular as shown in FIG. 2B or quadrilateral, such as a square, a rhombus, or a trapezoid. In an embodiment, a planar shape of the cover window 50 may be one of a circular shape, an oval shape, a triangular shape, or an N-gonal shape, where N is a positive integer equal to or greater than 5. In some embodiments, a planar shape of the cover window 50 has rounded corners. Hereinafter, an embodiment in which a planar shape of the cover window 50 is rectangular with rounded corners will be mainly described for convenience of explanation.

The cover window 50 has a plate shape and is thus flat. A first surface 50a and a second surface 50b of the cover window 50 are both flat. For example, the first surface is attached to the adhesive member 552, and the second surface 50b is externally exposed.

The buffer portion 560 is fixed to the stage 510 or the support 530. The buffer portion 560 reduces movement of the linear motion portion 540 when the linear motion portion 540 falls. In an embodiment, the buffer portion 560 includes a pneumatic cylinder or a hydraulic cylinder. In an embodiment, the buffer portion 560 includes a contact member in contact with a linear motion portion and a spring in contact with the contact member. In an embodiment, the buffer portion 560 includes an elastic bar such as rubber or silicone.

The above-described apparatus 500 for manufacturing a display device allows an impact test of the cover window 50 to proceed.

For example, the mock-up portion 550 on which the cover window 50 is disposed corresponds to an actual electronic device. For example, a three-point bending test of an actual electronic device to which the cover window 50 on which an experiment is to be carried out is attached and a three-point bending test when 30° rotated with respect to an arbitrary line segment that connects two second contact points can be performed. An amount of change in force as a function of an amount of change in a deformation value of the actual electronic device can be calculated from such test results. The mock-up portion 550 is fabricated based on a result calculated as described above. For example, as described above, an amount of change in force as a function of an amount of change in a deformation value of the mock-up portion 550 according to results of a three-point bending test of the mock-up portion 550 and a three-point bending test when 30° rotated with respect to an arbitrary line segment connecting two second contact points is the same as or similar to an amount of change in force as a function of an amount of change in a deformation value of the actual electronic device. For example, the mock-up portion 550 has substantially the same stiffness as an actual electronic device. For example, a combination of the mock-up body portion 551 and the load portion 551b of the mock-up portion 550 have values that are be stored in the form of a table in a separate external device, such as a computer, where the values correspond to an amount of change in force as a function of an amount of change in a deformation value obtained in a three-point bending test of the actual electronic device and a three-point bending test when 30° rotated with respect to an arbitrary line segment that connects two second contact points. In an embodiment, a combination of the mock-up body portion 551 and the load portion 551b of the mock-up portion 550 have values that are automatically matched in a separate external device, such as a computer, where the values correspond to an amount of change in force as a function of an amount of change in a deformation value obtained in a three-point bending test on the actual electronic device and a three-point bending test when 30° rotated with respect to an arbitrary line segment that connects two second contact points. In an embodiment, values of an amount of change in force according to a manufacturer, a date of manufacture, a model name, etc., of the actual electronic device are stored in a separate external device, such as a computer, where the amount of change in force according to a manufacturer, a date of manufacture, a model name, etc., of the actual is a function of an amount of change in a deformation value obtained in a three-point bending test on the actual electronic device and a three-point bending test when 30° rotated with respect to an arbitrary line segment that connects two second contact points Based on this, a combination of the mock-up body portion 551 and the load portion 551b of the mock-up portion 550 are matched in the external device or a combination of the mock-up body portion 551 and the load portion 551b are found from the data pre-stored in the external device. In an embodiment, the combination of the mock-up body portion 551 and the load portion 551b refers to a combination of at least one of a shape, a material, or a weight of the mock-up body portion 551 and at least one of the number, a shape, a material, or a weight of the load portion 551b.

When the mock-up portion 550 has been manufactured through an above process, the mock-up portion 550 is attached to the linear motion portion 540 and dropped. For example, the mock-up portion 550 may free-fall or may move down with the linear motion portion 540. For example, by dropping the mock-up portion 550, an experiment on breaking the cover window 50 that corresponds to when an actual electronic device falls on the floor is carried out.

The cover window 50 falling as described above collides with the surface member 520. For example, as described above, the surface member 520 includes sandpaper and thus simulates various surfaces with which the cover window 50 collides. For example, surface roughness of the surface member 520 is determined according to a surface to be simulated.

Referring to FIG. 3, as described above, when the cover window 50 collides with the surface member 520 while being attached to an actual electronic device or being attached to the mock-up portion 550, cracks can occur in a surface of the cover window 50. For example, a surface of the cover window 50 can radially crack from one point. For example, as shown in FIG. 3, the form of first cracks CR1 in a comparative example in which a cover window attached to an actual electronic device collided with the surface member 520 is the same as or similar to the form of second cracks CR2 in an experimental example in which the cover window 50 attached to the mock-up portion 550 collides with the surface member 520. Thus, when an experiment is carried out by attaching the cover window 50 to the mock-up portion 550, the breakage tendency is similar to that of a cover window disposed at an actual electronic device when the actual electronic device is dropped on a surface or collides with a surface, etc.

Accordingly, the apparatus 500 for manufacturing a display device can simulate a breakage tendency of the cover window 50 disposed at an actual electronic device through an above process. In addition, the apparatus 500 for manufacturing a display device can fabricate the cover window 50 that is resistant to collision by varying factors, such as a material of the cover window 50, a thickness of the cover window 50, and surface treatment of the cover window 50, based on a result obtained from an above process.

Figure 4A:
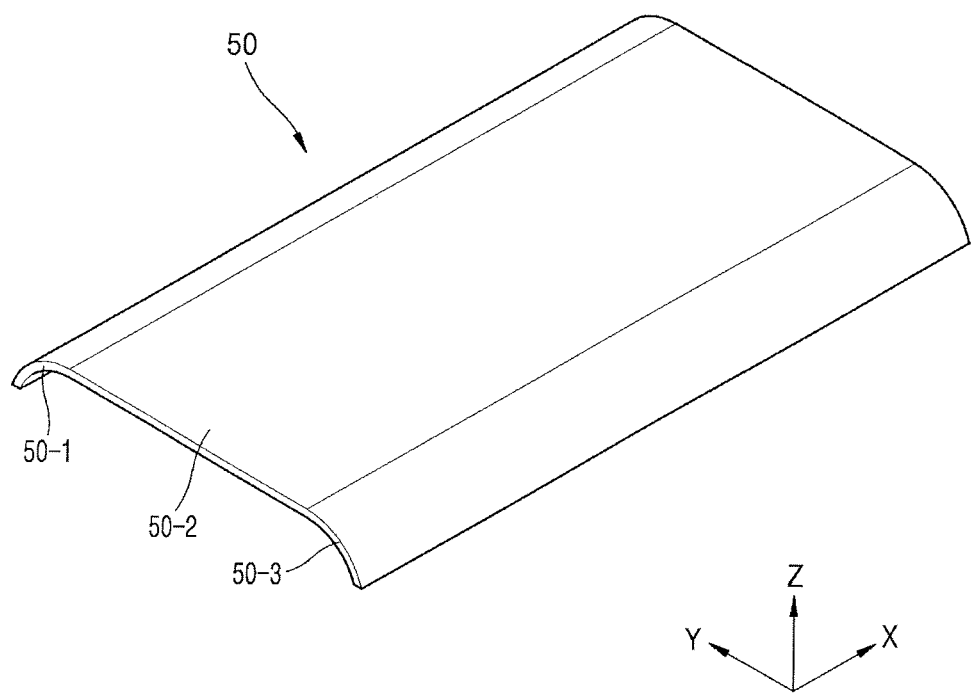
FIG. 4A is a perspective view of a cover window according to another embodiment.
Figure 4B:
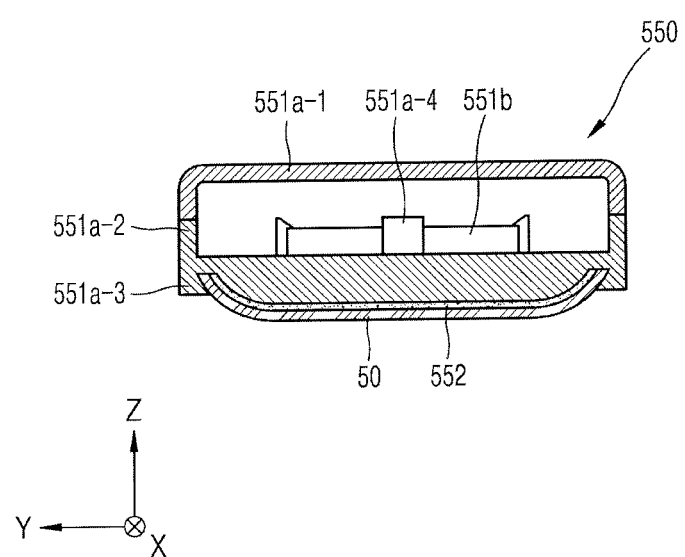
FIG. 4B is a cross-sectional view of the cover window of FIG. 4A attached to a mock-up portion.

FIG. 4A is a perspective view of the cover window 50 according to an embodiment. FIG. 4B is a cross-sectional view of the cover window 50 of FIG. 4A attached to the mock-up portion 550.

Referring to FIGS. 4A and 4B, in an embodiment, at least a portion of the cover window 50 is curved. For example, the cover window 50 includes a curved first portion 50-1, a flat second portion 50-2, and a curved third portion 50-3. The first portion 50-1, the second portion 50-2, and the third portion 50-3 are integrally formed with one another.

In an embodiment, the first portion 50-1 and the third portion 50-3 are connected to side surfaces of the second portion 50-2 and are arranged on opposite sides of the second portion 50-2. In particular, when the second portion 50-2 has a rectangular shape, the first portion 50-1 and the third portion 50-3 are respectively connected to opposite long sides of the second portion 50-2.

The first portion 50-1 and the third portion 50-3 may have various shapes. For example, in an embodiment, the first portion 50-1 and the third portion 50-3 have the same width and same shape as each other. In an embodiment, a width of the first portion 50-1 differs from a width of the third portion 50-3. In embodiments, a width of the first portion 50-1 or a width of the third portion 50-3 refers to a distance measured in a Y-axis direction of FIG. 4A from a boundary between the second portion 50-2 and the first portion 50-1 to an end of the first portion 50-1, or a distance from a boundary between the second portion 50-2 and the third portion 50-3 to an end of the third portion 50-3. Alternatively, in an embodiment, a width of the first portion 50-1 or a width of the third portion 50-3 refers to a distance measured along an outer surface of the first portion 50-1 in the Y-axis direction of FIG. 4A or a distance measured along an outer surface of the third portion 50-3.

In some embodiments, a shape of the first portion 50-1 and a shape of the third portion 50-3 differ from each other. For example, a radius of curvature of the first portion 50-1 and a radius of curvature of the third portion 50-3 differ from each other. For example, each of the first portion 50-1 and the third portion 50-3 is a curved surface having one radius of curvature. In an embodiment, the first portion 50-1 and the third portion 50-3 are curved surfaces that include a plurality of radii of curvature. For example, a radius of curvature of one of the curved surfaces of the first portion 50-1 differs from a radius of curvature of one of the curved surfaces of the third portion 50-3.

In some embodiments, a height of the first portion 50-1 and a height of the third portion 50-3 may be different from each other. A height of the first portion 50-1 refers to a distance in a Z-axis direction of FIG. 4A from an end of the first portion 50-1 to a flat surface of the second portion 50-2. In addition, a height of the third portion 50-3 refers to a distance in the Z-axis direction of FIG. 4A from an end of the third portion 50-3 to a flat surface of the second portion 50-2.

The cover window 50 is disposed on the mock-up portion 550. The mock-up portion 550 is substantially similar to that described with reference to FIGS. 2A and 2B.

In an embodiment, one of the surfaces of the second case 551a-2 is rounded. In addition, the adhesive member 552 is disposed on the second case 551a-2, and thus, the adhesive member 552 fixes the cover window 50. In addition, the protrusion 551a-3 that protects the edge of the cover window 50 is disposed at the edge of the second case 551a-2. For example, the load portion 551b is fixed to the inside of the first case 551a-1 and the second case 551a-2 by the coupling protrusion 551a-4.

In an embodiment, by using the mock-up portion 550 when the partially rounded cover window 50 is not disposed at an actual electronic device, the breakage tendency can be simulated in the same or similar form as when the cover window 50 is disposed on an actual electronic device.

Figure 5:
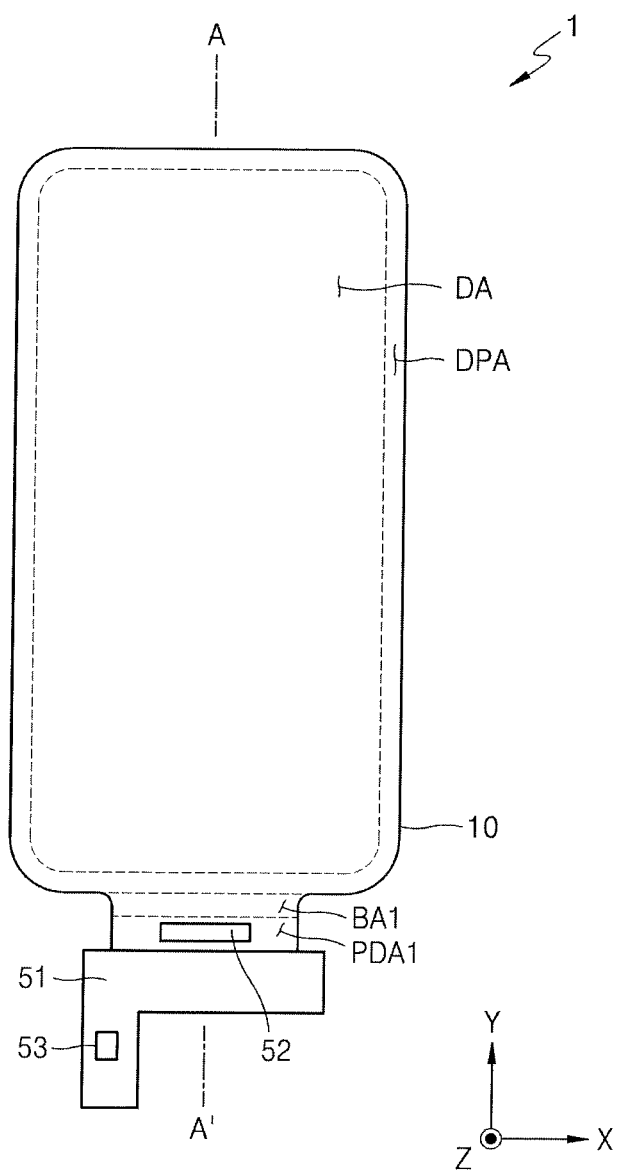
FIG. 5 is a plan view of a display device according to an embodiment.
Figure 6:
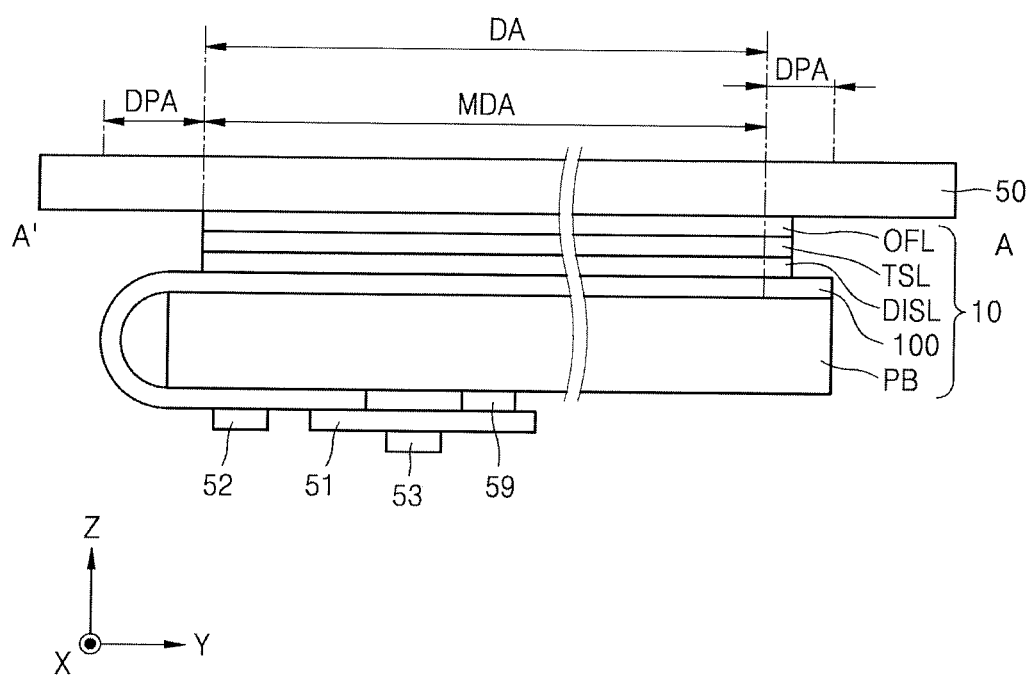
FIG. 6 is a cross-sectional view of a display device of FIG. 5, taken along line A-A' of FIG. 5.
Figure 7:
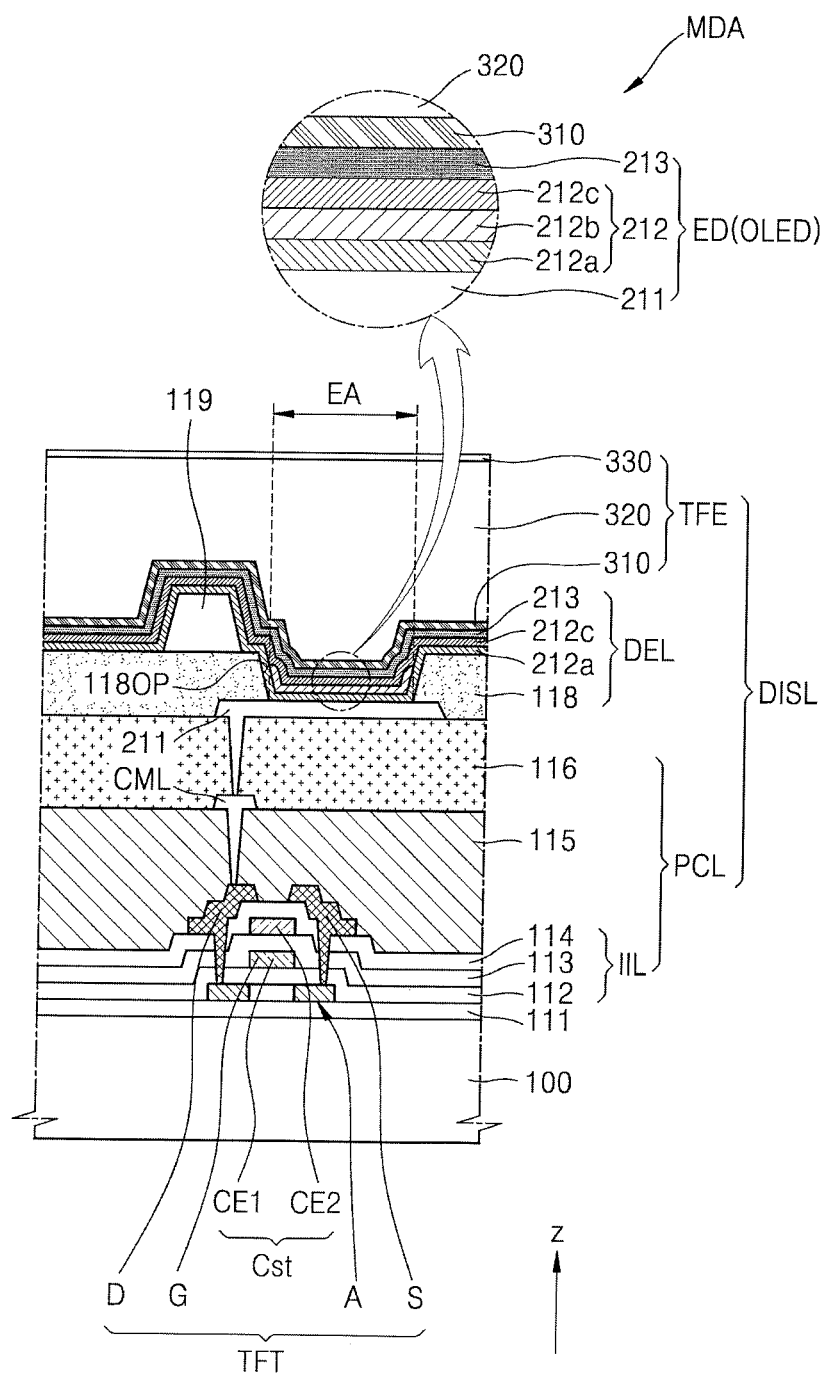
FIG. 7 is a cross-sectional view of a portion of a display panel shown in FIG. 5.

FIG. 5 is a plan view of a display device 1 according to an embodiment. FIG. 6 is a cross-sectional view of the display device 1 of FIG. 5, taken along line A-A' of FIG. 5. FIG. 7 is a cross-sectional view of a display panel 10 shown in FIG. 5.

Referring to FIGS. 5 to 7, in an embodiment, the display device 1 includes the display panel 10, a display circuit board 51, a display driver 52, and a touch sensor driver 53. The display panel 10 is a light-emitting display panel that includes a light-emitting element. For example, the display panel 10 is one of an organic light-emitting display panel that uses an organic light-emitting diode that includes an organic emission layer, a micro light-emitting diode (LED) display panel that uses a micro LED, a quantum-dot light-emitting display panel that uses a quantum-dot light-emitting diode that includes a quantum-dot emission layer, or an inorganic light-emitting display panel that uses an inorganic light-emitting diode that includes an inorganic semiconductor.

In an embodiment, display panel 10 is a transparent display panel such that an object or background located on a bottom surface of the display panel 10 can be viewed through a top surface of the display panel 10. Alternatively, in an embodiment, the display panel 10 is a reflective display panel that reflects an object or background of a top surface of the display panel 10.

The display panel 10 includes a display area DA in which an image is displayed and a peripheral area DPA that surrounds the display area DA. A separate driving circuit, a pad, etc., is disposed in the peripheral area DPA.

In an embodiment, the peripheral area DPA includes a bendable area BA1 and a pad area PDA1. The bendable area BA1 and the pad area PDA1 protrude from the peripheral area DPA at one side of the display panel 10 in a Y-direction. As shown in FIG. 6, lengths of the bending area BA1 and the pad area PDA1 in an X-direction are less than a width of the display area DA in the X-direction.

The display panel 10 can be bent in the bendable area BA1, and the pad area PDA1 is disposed over a bottom surface of a panel protection member PB. The pad area PDA1 overlaps the display area DA in a thickness direction (a Z-direction) of the display panel 10. For example, the pad area PDA1 is fixed to the panel protection member PB through a panel adhesion member 59. The panel adhesion member 59 is a pressure-sensitive adhesive (PSA). The display driver 52 is disposed in the pad area PDA1, and the display circuit board 51 is connected thereto.

In an embodiment, the peripheral area DPA does not include the bendable area BA1. For example, a flexible film described below is bent, or the display circuit board 51 is bent. The panel adhesion member 59 is disposed in the same or similar manner as described above.

In an embodiment, neither the display panel 10 nor the display circuit board 51 are bent.

The display area DA includes a plurality of pixels, which are light-emitting elements, and an image is displayed through the plurality of pixels. In an embodiment, each of the plurality of pixels includes sub-pixels. For example, each of the plurality of pixels includes a red sub-pixel, a green sub-pixel, and a blue sub-pixel. Alternatively, in an embodiment, each of the plurality of pixels includes a red sub-pixel, a green sub-pixel, a blue sub-pixel, and a white sub-pixel.

The display circuit board 51 is attached to one side edge of the display panel 10.

The display driver 52 may be disposed on one of various portions. For example, in an embodiment, the display driver 52 is disposed on a substrate 100 of the display panel 10. In an embodiment, the display driver 52 is disposed on a flexible film. In an embodiment, the display driver 52 is disposed on the display circuit board 51. Hereinafter, an embodiment in which the display driver 52 is disposed on the substrate 100 will be mainly described for convenience of explanation.

The display driver 52 receives control signals and power voltages and generates and outputs signals and voltages that drive the display panel 10. The display driver 52 is implemented as an integrated circuit (IC).

The display circuit board 51 is attached to the display panel 10. The display circuit board 51 and the display panel 10 may be connected to each other in various ways. In an embodiment, the display circuit board 51 and the display panel 10 are attached to each other by using a flexible film. The flexible film is connected to the display panel 10 and the display circuit board 51 through an anisotropic conductive film. The display circuit board 51 may be a flexible printed circuit board (FPCB) that can be bent, or may be a hybrid printed circuit board that includes both a rigid printed circuit board (rigid PCB) that is not easy to bend and an FPCB.

In an embodiment, one side of the display circuit board 51 is directly attached to one side edge of the display panel 10 by using an anisotropic conductive film. Hereinafter, an embodiment in which the display circuit board 51 and the display panel 10 are connected to each other through an anisotropic conductive film will be mainly described for convenience of explanation.

The touch sensor driver 53 is disposed on the display circuit board 51. The touch sensor driver 53 is implemented as an IC. The touch sensor driver 53 is attached onto the display circuit board 51. The touch sensor driver 53 is electrically connected to touch electrodes of a touchscreen layer TSL of the display panel 10 through the display circuit board 51.

The touchscreen layer TSL of the display panel 10 can sense a user's touch input by using at least one of various touch methods, such as a resistive method and a capacitive method. For example, when the touchscreen layer TSL of the display panel 10 capacitively senses a user's touch input, the touch sensor driver 53 transmits driving signals to driving electrodes of the touch electrodes and senses, through sensing electrodes of the touch electrodes, voltages charged by mutual capacitances between the driving electrodes and the sensing electrodes, thereby determining whether there is a user's touch. The user's touch includes a contact touch and/or a proximity touch. The contact touch refers to a direct contact of a cover member disposed on the touchscreen layer TSL with an object, such as a user's finger or a pen. The proximity touch refers to an object, such as a user's finger or a pen, being positioned above and close to the cover member, such as hovering. The touch sensor driver 53 transmits to a main processor sensor data based on the sensed voltages, and the main processor analyzes the sensor data to calculate touch coordinates of the touch input.

In an embodiment, a power supply that supplies driving voltages that drive the pixels of the display panel 10, a scan driver, and the display driver 52 are additionally disposed on the display circuit board 51. Alternatively, in an embodiment, the power supply is integrated with the display driver 52, and the display driver 52 and the power supply are implemented as a single integrated circuit.

Referring now to FIG. 6, in an embodiment, the display panel 10 includes the substrate 100, a display layer DISL, the touchscreen layer TSL, an optical functional layer OFL, and the panel protection member PB.

The display layer DISL is disposed on the substrate 100. The display layer DISL includes pixels and displays an image. The display layer DISL includes a circuit layer that includes thin-film transistors, a display element layer that includes display elements, and an encapsulation member that encapsulates the display element layer.

The display layer DISL is divided into the display area DA and the peripheral area DPA. The display area DA is where pixels are arranged to display an image. The peripheral area DPA is arranged outside the display area DA and does not display an image. The peripheral area DPA surrounds the display area DA. The peripheral area DPA extends out from the display area DA to the edge of the display panel 10. In addition to pixels, pixel circuits that drive the pixels, scan lines, data lines and power lines connected to the pixel circuits, etc., are arranged in the display area DA. A scan driver that transmits scan signals to the scan lines, fan-out lines that connect the data lines to the the display driver 52, etc., are arranged in the peripheral area DPA.

The touchscreen layer TSL is disposed on the display layer DISL. The touchscreen layer TSL includes touch electrodes, and senses whether a user's touch has occurred. In an embodiment, the touchscreen layer TSL is directly formed on the encapsulation member of the display layer DISL. Alternatively, in an embodiment, the touchscreen layer TSL is separately formed and then coupled to the encapsulation member of the display layer DISL through an adhesive layer, such as an optically clear adhesive (OCA).

The optical functional layer OFL is disposed on the touchscreen layer TSL. The optical functional layer OFL includes an anti-reflection layer. The anti-reflection layer reduce the reflectivity of light, such as external light, that is incident on the display device 1.

In some embodiments, the anti-reflection layer includes a polarizing film. The polarizing film includes a linear polarizer and a retardation film, such as a $\lambda/4$ plate (quarter-wave plate). The retardation film is disposed on the touchscreen layer TSL, and the linear polarizer is disposed on the retardation film.

In some embodiments, the anti-reflection layer includes a filter layer that includes a black matrix and color filters. The color filters take into account a color of light emitted from each of the pixels of the display device 1. For example, the filter layer includes a red, green, or blue color filter.

In some embodiments, the anti-reflection layer includes a destructive interference structure. The destructive interference structure includes a first reflection layer and a second reflection layer that are respectively disposed on different layers. First reflected light and second reflected light that are respectively reflected by the first reflection layer and the second reflection layer destructively interfere with each other, and thus, the reflectivity of external light is reduced.

The cover window 50 is disposed on the optical functional layer OFL. The cover window 50 is attached onto the optical functional layer OFL by a transparent adhesive member, such as an OCA film.

The panel protection member PB is disposed under the display panel 10. The panel protection member PB is attached to a bottom surface of the display panel 10 through an adhesive member. The adhesive member is a PSA. The panel protection member PB includes at least one of a light-absorbing layer that absorbs external light, a cushion layer that absorbs an external impact, or a heat-dissipating layer that efficiently dissipates heat from the display panel 10.

The light-absorbing layer is disposed under the display panel 10. The light-absorbing layer blocks light transmission and thus prevents elements under the light-absorbing layer, such as the display circuit board 51, etc., from being viewed from above the display panel 10. The light-absorbing layer includes a light-absorbing material, such as a black pigment or a black dye.

The cushion layer is disposed under the light-absorbing layer. The cushion layer absorbs external impacts to prevent destruction of the display panel 10. The cushion layer may include a single layer or a plurality of layers. For example, the cushion layer includes a polymer resin, such as polyurethane, polycarbonate, polypropylene, or polyethylene, etc., or include an elastic material, such as a sponge formed by foaming rubber, a urethane-based material, or an acryl-based material.

The heat-dissipating layer is disposed under the cushion layer. The heat-dissipating layer includes a first heat-dissipating layer that includes graphite or carbon nanotubes, and a second heat-dissipating layer formed of a metal thin-film, such as copper, nickel, ferrite, or silver, that can shield electromagnetic interference and is thermally conductive.

Referring now to FIG. 7, in an embodiment, the display panel 10 includes the substrate 100, a buffer layer 111, the display layer DISL, and a thin-film encapsulation layer TFE. The display layer DISL includes a pixel circuit layer PCL and a display element layer DEL.

The substrate 100 includes a polymer resin, such as at least one of polyethersulfone, polyarylate, polyetherimide, polyethylene naphthalate, polyethylene terephthalate, polyphenylene sulfide, polyimide, polycarbonate, cellulose triacetate, or cellulose acetate propionate, etc. The substrate 100 is flexible, rollable and/or bendable. The substrate 100 may have a multi-layer structure that includes a base layer that includes the above-described polymer resin and a barrier layer.

The buffer layer 111 includes an inorganic insulating material, such as at least one of silicon nitride, silicon oxynitride, or silicon oxide, and may have a single-layer or multi-layer structure that includes the above-described inorganic insulating material.

The pixel circuit layer PCL is disposed on the buffer layer 111. The pixel circuit layer PCL includes a thin-film transistor TFT in a pixel circuit, an inorganic insulating layer OIL, a first planarization layer 115, and a second planarization layer 116 disposed below and/or over elements of the thin-film transistor TFT. The inorganic insulating layer IIL includes a first gate insulating layer 112, a second gate insulating layer 113, and an interlayer insulating layer 114.

In an embodiment, the thin-film transistor TFT includes a semiconductor layer A, and the semiconductor layer A includes polysilicon. Alternatively, in an embodiment, the semiconductor layer A includes one of amorphous silicon, an oxide semiconductor, or an organic semiconductor. The semiconductor layer A includes a channel region, and a drain region and a source region respectively disposed on each side of the channel region. A gate electrode G overlaps the channel region.

The gate electrode G includes a low-resistance metal. The gate electrode G includes a conductive material that includes at least one of molybdenum (Mo), aluminum (Al), copper (Cu), or titanium (Ti), etc., and may have a multi-layer or single-layer structure that includes the above-described material.

The first gate insulating layer 112 is interposed between the semiconductor layer A and the gate electrode G and includes an inorganic insulating material, such as at least one of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be zinc oxide (ZnO) and/or zinc peroxide ($ZnO_2$).

The second gate insulating layer 113 covers the gate electrode G. Similar to the first gate insulating layer 112, the second gate insulating layer 113 includes an inorganic insulating material, such as one of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be zinc oxide (ZnO) and/or zinc peroxide ($ZnO_2$).

An upper electrode CE2 of a storage capacitor Cst is disposed on the second gate insulating layer 113. The upper electrode CE2 overlaps the gate electrode G therebelow. The gate electrode G and the upper electrode CE2 with the second gate insulating layer 113 therebetween constitute the storage capacitor Cst of the pixel circuit. For example, the gate electrode G is a lower electrode CE1 of the storage capacitor Cst. As such, the storage capacitor Cst and the thin-film transistor TFT overlap each other. In some embodiments, the storage capacitor Cst does not overlap the thin-film transistor TFT.

The upper electrode CE2 includes at least one of aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W) and/or copper (Cu), and may have a single-layer or multi-layer structure that includes the above-described material.

The interlayer insulating layer 114 covers the upper electrode CE2. The interlayer insulating layer 114 includes at least one of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be zinc oxide (ZnO) and/or zinc peroxide ($ZnO_2$). The interlayer insulating layer 114 may have a single-layer or multi-layer structure that includes the above-described inorganic insulating material.

A drain electrode D and a source electrode S are each disposed on the interlayer insulating layer 114. The drain electrode D and the source electrode S each includes a highly conductive material. The drain electrode D and the source electrode S each includes a conductive material, such as at least one of molybdenum (Mo), aluminum (Al), copper (Cu), or titanium (Ti), etc., and may have a multi-layer or single-layer structure that includes the above-described material. In an embodiment, the drain electrode D and the source electrode S each have a multi-layer structure of titanium (Ti)/aluminum (Al)/titanium (Ti).

The first planarization layer 115 covers the drain electrode D and the source electrode S. The first planarization layer 115 includes an organic insulating layer. The first planarization layer 115 includes an organic insulating material, such as a general commercial polymer such as polymethylmethacrylate (PMMA) or polystyrene (PS), a polymer derivative that includes a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend thereof.

A connection electrode CML is disposed on the first planarization layer 115. The connection electrode CML is connected to the drain electrode D or the source electrode S through a contact hole in the first planarization layer 115. The connection electrode CML includes a highly conductive material. The connection electrode CML includes a conductive material that includes at least one of molybdenum (Mo), aluminum (Al), copper (Cu), or titanium (Ti), etc., and may have a multi-layer or single-layer structure that includes the above-described material. In an embodiment, the connection electrode CML has a multi-layer structure of titanium (Ti)/aluminum (Al)/titanium (Ti).

The second planarization layer 116 covers the connection electrode CML. The second planarization layer 116 includes an organic insulating layer. The second planarization layer 116 includes an organic insulating material, such as a general commercial polymer, such as PMMA or PS, a polymer derivative that includes a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend thereof.

The display element layer DEL is disposed on the pixel circuit layer PCL. The display element layer DEL includes a light-emitting element ED. The light-emitting element ED is an organic light-emitting diode OLED. A pixel electrode 211 of the light-emitting element ED is electrically connected to the connection electrode CML through a contact hole in the second planarization layer 116.

In an embodiment, the pixel electrode 211 includes a conductive oxide, such as at least one of indium tin oxide (ITO), indium zinc oxide (IZO), zinc oxide (ZnO), indium oxide ($In_2O_3$), indium gallium oxide (IGO), or aluminum zinc oxide (AZO). In an embodiment, the pixel electrode 211 includes a reflective layer that includes at least one of silver (Ag), magnesium (Mg), aluminum (Al), platinum (Pt), palladium (Pd), gold (Au), nickel (Ni), neodymium (Nd), iridium (Ir), chromium (Cr), or a compound thereof. In an embodiment, the pixel electrode 211 further includes a layer formed of ITO, IZO, ZnO, or $In_2O_3$ on or under the above-described reflective layer.

A pixel-defining layer 118 that includes an opening 118OP that exposes a central portion of the pixel electrode 211 is disposed on the pixel electrode 211. The pixel-defining layer 118 includes an organic insulating material and/or an inorganic insulating material. The opening 118OP defines an emission area EA of light emitted from the light-emitting element ED. For example, a width of the opening 118OP corresponds to a width of the emission area EA of the light-emitting element ED.

A spacer 119 is disposed on the pixel-defining layer 118. The spacer 119 prevents destruction of the substrate 100 during a method of manufacturing a display device. A mask sheet is used to manufacture a display panel. The spacer can prevent a situation in which the mask sheet enters the opening 118OP or closely contacts the pixel-defining layer 118, thus damaging or destroying a portion of the substrate 100 when a deposition material is deposited on the substrate 100.

In an embodiment, the spacer 119 includes an organic insulating material, such as polyimide. Alternatively, in some embodiments, the spacer 119 includes an inorganic insulating material, such as one of silicon nitride or silicon oxide, or includes an organic insulating material and an inorganic insulating material.

In an embodiment, the spacer 119 includes a different material from the pixel-defining layer 118. Alternatively, in an embodiment, the spacer 119 includes the same material as the pixel-defining layer 118, and the pixel-defining layer 118 and the spacer 119 are formed together in a mask process that uses a halftone mask, etc.

An intermediate layer 212 is disposed on the pixel-defining layer 118. The intermediate layer 212 includes an emission layer 212b disposed in the opening 118OP of the pixel-defining layer 118. The emission layer 212b includes a at least one of a polymer organic material or a low-molecular weight organic material that emits light of a predetermined color.

A first functional layer 212a and a second functional layer 212c are disposed under and on the emission layer 212b, respectively. The first functional layer 212a includes, for example, a hole transport layer (HTL) and/or a hole injection layer (HIL). The second functional layer 212c is disposed on the emission layer 212b and is optional. The second functional layer 212c includes an electron transport layer (ETL) and/or an electron injection layer (EIL). The first functional layer 212a and/or the second functional layer 212c are common layers that covers the entire substrate 100 as does an opposite electrode 213 described below.

The opposite electrode 213 includes a conductive material that has a low work function. For example, in an embodiment, the opposite electrode 213 includes a (semi)transparent layer that include at least one of silver (Ag), magnesium (Mg), aluminum (Al), platinum (Pt), palladium (Pd), gold (Au), nickel (Ni), neodymium (Nd), iridium (Ir), chromium (Cr), lithium (Li), or calcium (Ca), or an alloy thereof. Alternatively, in an embodiment, the opposite electrode 213 further includes a layer, such as ITO, IZO, ZnO, or $In_2O_3$, on a (semi)transparent layer that includes the above-described materials.

In some embodiments, a capping layer is further disposed on the opposite electrode 213. The capping layer includes at least one of lithium fluoride (LiF), an inorganic material, and/or an organic material.

The thin-film encapsulation layer TFE is disposed on the opposite electrode 213. In an embodiment, the thin-film encapsulation layer TFE includes at least one inorganic encapsulation layer and at least one organic encapsulation layer, and FIG. 7 shows the thin-film encapsulation layer TFE as including a first inorganic encapsulation layer 310, an organic encapsulation layer 320, and a second inorganic encapsulation layer 330 sequentially stacked on each other.

The first inorganic encapsulation layer 310 and the second inorganic encapsulation layer 330 each include one or more inorganic materials of aluminum oxide, titanium oxide, tantalum oxide, hafnium oxide, zinc oxide, silicon oxide, silicon nitride, or silicon oxynitride. The organic encapsulation layer 320 includes a polymer-based material. Examples of the polymer-based material include an acryl-based resin, an epoxy-based resin, a polyimide, and polyethylene. In an embodiment, the organic encapsulation layer 320 includes acrylate.

Figure 8A:
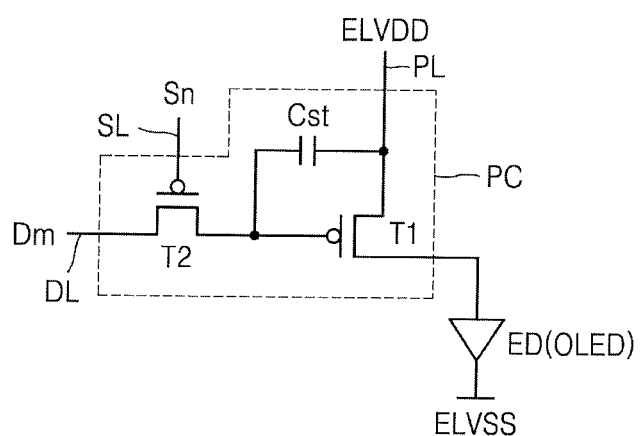
FIGS. 8A and 8B are circuit diagrams of a circuit of a display device shown in FIG. 7.
Figure 8B:
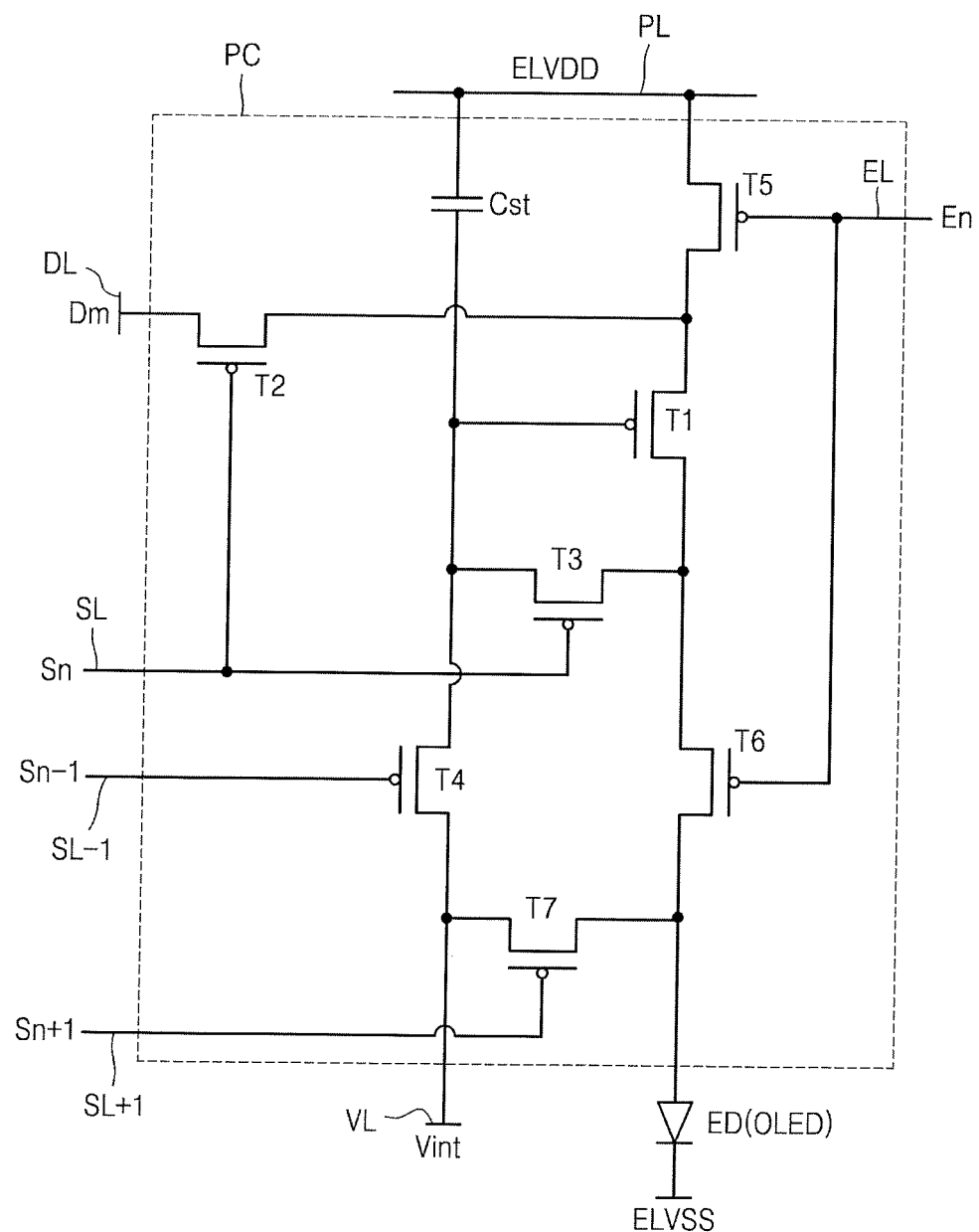

FIGS. 8A and 8B are circuit diagrams of a circuit of a display device shown in FIG. 7.

Referring to FIGS. 8A and 8B, in an embodiment, a pixel circuit PC is connected to the light-emitting element ED of the sub-pixels that emit light. The pixel circuit PC includes a driving thin-film transistor T1, a switching thin-film transistor T2, and the storage capacitor Cst. The switching thin-film transistor T2 is connected to a scan line SL and a data line DL and transmits a data signal Dm received through the data line DL to the driving thin-film transistor T1 according to a scan signal Sn received through the scan line SL.

The storage capacitor Cst is connected to the switching thin-film transistor T2 and a driving voltage line PL and stores a voltage that corresponds to a difference between a voltage received from the switching thin-film transistor T2 and a driving voltage ELVDD received through the driving voltage line PL.

The driving thin-film transistor T1 is connected to the driving voltage line PL, the storage capacitor Cst and the switching thin-film transistor T2, and controls a driving current flowing through the light-emitting element ED from the driving voltage line PL in response to a voltage value stored in the storage capacitor Cst. The light-emitting element ED emits light whose brightness corresponds to the driving current.

Although FIG. 8A shows an embodiment in which the pixel circuit PC includes two thin-film transistors and one storage capacitor, embodiments are not necessarily limited thereto.

Referring to FIG. 8B, in an embodiment, the pixel circuit PC includes the driving thin-film transistor T1, the switching thin-film transistor T2, a compensation thin-film transistor T3, a first initialization thin-film transistor T4, an operation control thin-film transistor T5, an emission control thin-film transistor T6, a second initialization thin-film transistor T7, and the storage capacitor Cst.

Although FIG. 8B shows an embodiment in which signal lines, such as the scan line SL, a previous scan line SL−1, a next scan line SL+1, an emission control line EL, and the data line DL, an initialization voltage line VL, and the driving voltage line PL are provided for each pixel circuit PC, embodiments are not necessarily limited thereto. In some embodiments, at least one of signal lines, such as the scan line SL, the previous scan line SL−1, the next scan line SL+1, the emission control line EL, and the data line DL, and/or the initialization voltage line VL, is shared by neighboring pixel circuits.

A drain electrode of the driving thin-film transistor T1 is electrically connected to the light-emitting element ED via the emission control thin-film transistor T6. The driving thin-film transistor T1 receives the data signal Dm according to a switching operation of the switching thin-film transistor T2 and supplies a driving current to the light-emitting element ED.

A gate electrode of the switching thin-film transistor T2 is connected to the scan line SL, and a source electrode of the switching thin-film transistor T2 is connected to the data line DL. A drain electrode of the switching thin-film transistor T2 is connected to a source electrode of the driving thin-film transistor T1 and is also connected to the driving voltage line PL via the operation control thin-film transistor T5.

The switching thin-film transistor T2 may be turned on according to the scan signal Sn received through the scan line SL and configured to perform a switching operation for transferring the data signal Dm transmitted through the data line DL to the source electrode of the driving thin-film transistor T1.

A gate electrode of the compensation thin-film transistor T3 is connected to the scan line SL. A source electrode of the compensation thin-film transistor T3 is connected to the drain electrode of the driving thin-film transistor T1 and is also connected to a pixel electrode of the light-emitting element ED via the emission control thin-film transistor T6. A drain electrode of the compensation thin-film transistor T3 is connected to one electrode of the storage capacitor Cst, a source electrode of the first initialization thin-film transistor T4, and a gate electrode of the driving thin-film transistor T1. The compensation thin-film transistor T3 is turned on according to the scan signal Sn received through the scan line SL and diode-connects the driving thin-film transistor T1 by connecting the gate electrode and the drain electrode of the driving thin-film transistor T1 to each other.

A gate electrode of the first initialization thin-film transistor T4 is connected to the previous scan line SL−1. A drain electrode of the first initialization thin-film transistor T4 may be connected to the initialization voltage line VL. The source electrode of the first initialization thin-film transistor T4 is connected to one electrode of the storage capacitor Cst, the drain electrode of the compensation thin-film transistor T3, and the gate electrode of the driving thin-film transistor T1. The first initialization thin-film transistor T4 is turned on according to a previous scan signal Sn−1 received through the previous scan line SL−1 and initializes a voltage of the gate electrode of the driving thin-film transistor T1 by transmitting an initialization voltage Vint to the gate electrode of the driving thin-film transistor T1.

A gate electrode of the operation control thin-film transistor T5 is connected to the emission control line EL. A source electrode of the operation control thin-film transistor T5 is connected to the driving voltage line PL. A drain electrode of the operation control thin-film transistor T5 is connected to the source electrode of the driving thin-film transistor T1 and the drain electrode of the switching thin-film transistor T2.

A gate electrode of the emission control thin-film transistor T6 is connected to the emission control line EL. A source electrode of the emission control thin-film transistor T6 is connected to the drain electrode of the driving thin-film transistor T1 and the source electrode of the compensation thin-film transistor T3. A drain electrode of the emission control thin-film transistor T6 is electrically connected to the pixel electrode of the light-emitting element ED. As the operation control thin-film transistor T5 and the emission control thin-film transistor T6 are simultaneously turned on according to an emission control signal En received through the emission control line EL, the driving voltage ELVDD is transmitted to the light-emitting element ED, and a driving current flows through the light-emitting element ED.

A gate electrode of the second initialization thin-film transistor T7 is connected to the next scan line SL+1. A source electrode of the second initialization thin-film transistor T7 is connected to the pixel electrode of the light-emitting element ED. A drain electrode of the second initialization thin-film transistor T7 is connected to the initialization voltage line VL. The second initialization thin-film transistor T7 is turned on according to a next scan signal Sn+1 received through the next scan line SL+1 and initializes the pixel electrode of the light-emitting element ED.

Although FIG. 8B shows an embodiment in which the first initialization thin-film transistor T4 and the second initialization thin-film transistor T7 are connected to the previous scan line SL−1 and the next scan line SL+1, respectively, embodiments are not necessarily limited thereto. In some embodiments, both the first initialization thin-film transistor T4 and the second initialization thin-film transistor T7 are connected to the previous scan line SL−1 and driven according to the previous scan signal Sn−1.

The other electrode of the storage capacitor Cst is connected to the driving voltage line PL. One electrode of the storage capacitor Cst is connected to the gate electrode of the driving thin-film transistor T1, the drain electrode of the compensation thin-film transistor T3, and the source electrode of the first initialization thin-film transistor T4.

An opposite electrode, such as a cathode, of the light-emitting element ED receives a common voltage ELVSS. The light-emitting element ED receives a driving current from the driving thin-film transistor T1 and emits light.

The pixel circuit PC is not limited to the number of thin-film transistors and storage capacitors and the circuit design described with reference to FIGS. 8A and 8B, and the number of thin-film transistors and storage capacitors and the circuit design ca be variously modified in other embodiments.

A method and apparatus for manufacturing a display device according to one or more embodiments described above includes a breakage test of a cover window that is simulated similarly to an actual product. A method and apparatus for manufacturing a display device according to one or more embodiments described above includes a simulation of a growth direction or growth shape of cracks that occur when a cover window collides with an external object.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of manufacturing a display device, the method comprising:
   performing a three-point bending test of an electronic device on which a cover window is attached;
   calculating a stiffness of the electronic device;
   fabricating a mock-up portion that has the stiffness of the electronic device, wherein the cover window is attached to the mock-up portion; and
   testing a breakage tendency of the cover window by dropping the cover window together with the mock-up portion.

2. The method of claim 1, further comprising dropping the cover window to a surface member.

3. The method of claim 1, wherein at least a portion of the cover window is bent.

4. The method of claim 1, further comprising attaching the cover window to an adhesive member of the mock-up portion.

5. The method of claim 4, wherein one surface of the cover window is exposed outside the mock-up portion.

6. The method of claim 1, wherein the stiffness of the mock-up portion calculated through the three-point bending test is in a range from 130 N/mm to 350 N/mm.

7. The method of claim 1, wherein the stiffness of the mock-up portion calculated through a three-point bending test at 30° is in a range from 50 N/mm to 200 N/mm.

8. The method of claim 1, wherein the mock-up portion comprises a mock-up body portion to which an adhesive member is attached.

9. The method of claim 8, wherein the mock-up portion further comprises a protrusion that protrudes from the mock-up body portion and surrounds a portion of a side surface of the cover window.

10. The method of claim 9, wherein a portion of the cover window protrudes from an end of the protrusion.

11. The method of claim 8, wherein the mock-up portion further comprises a plurality of load portions disposed in the mock-up body portion and that are spaced apart from each other.

* * * * *